United States Patent [19]

Brown

[11] 4,136,517

[45] Jan. 30, 1979

[54] THRUST CONTROL SYSTEM FOR A GAS TURBINE ENGINE

[75] Inventor: Harold Brown, Cincinnati, Ohio

[73] Assignee: General Electric Company, Cincinnati, Ohio

[21] Appl. No.: 702,526

[22] Filed: Jul. 6, 1976

[51] Int. Cl.[2] ............ F02K 3/00; F02C 9/04
[52] U.S. Cl. .................................. 60/223; 60/243
[58] Field of Search ............. 60/243, 39.28 R, 223

[56] References Cited

U.S. PATENT DOCUMENTS

| | | | |
|---|---|---|---|
| 3,772,880 | 11/1973 | Kubota | 60/39.28 R |
| 3,790,765 | 2/1974 | Morrison | 60/39.28 R |
| 3,813,063 | 5/1974 | Martin | 60/39.28 R |
| 3,854,287 | 12/1974 | Rembold | 60/243 |
| 3,867,717 | 2/1975 | Moehring | 60/39.28 R |

Primary Examiner—Robert E. Garrett
Attorney, Agent, or Firm—Henry J. Policinski; Derek P. Lawrence

[57] ABSTRACT

A thrust control system is provided for varying the thrust output of a gas turbine engine. The system is adapted to control the thrust output of the engine in a first mode in accordance with at least a pair of thrust-indicating parameters. The system is further adapted to control thrust output of the engine in a second mode in accordance with one of the thrust-indicating parameters.

13 Claims, 2 Drawing Figures

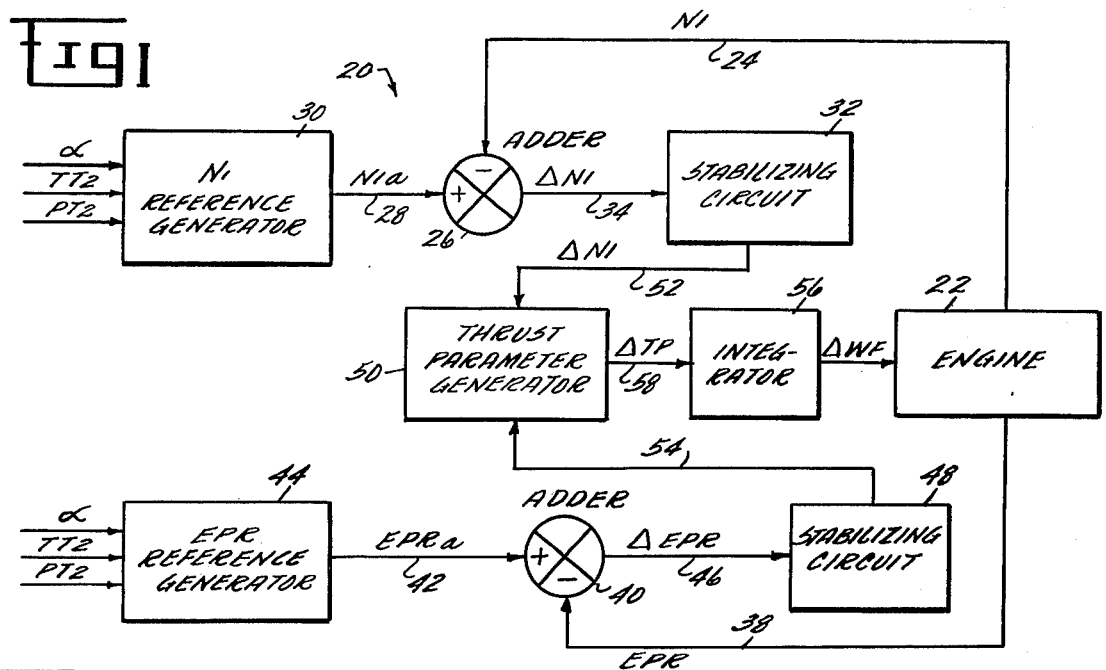
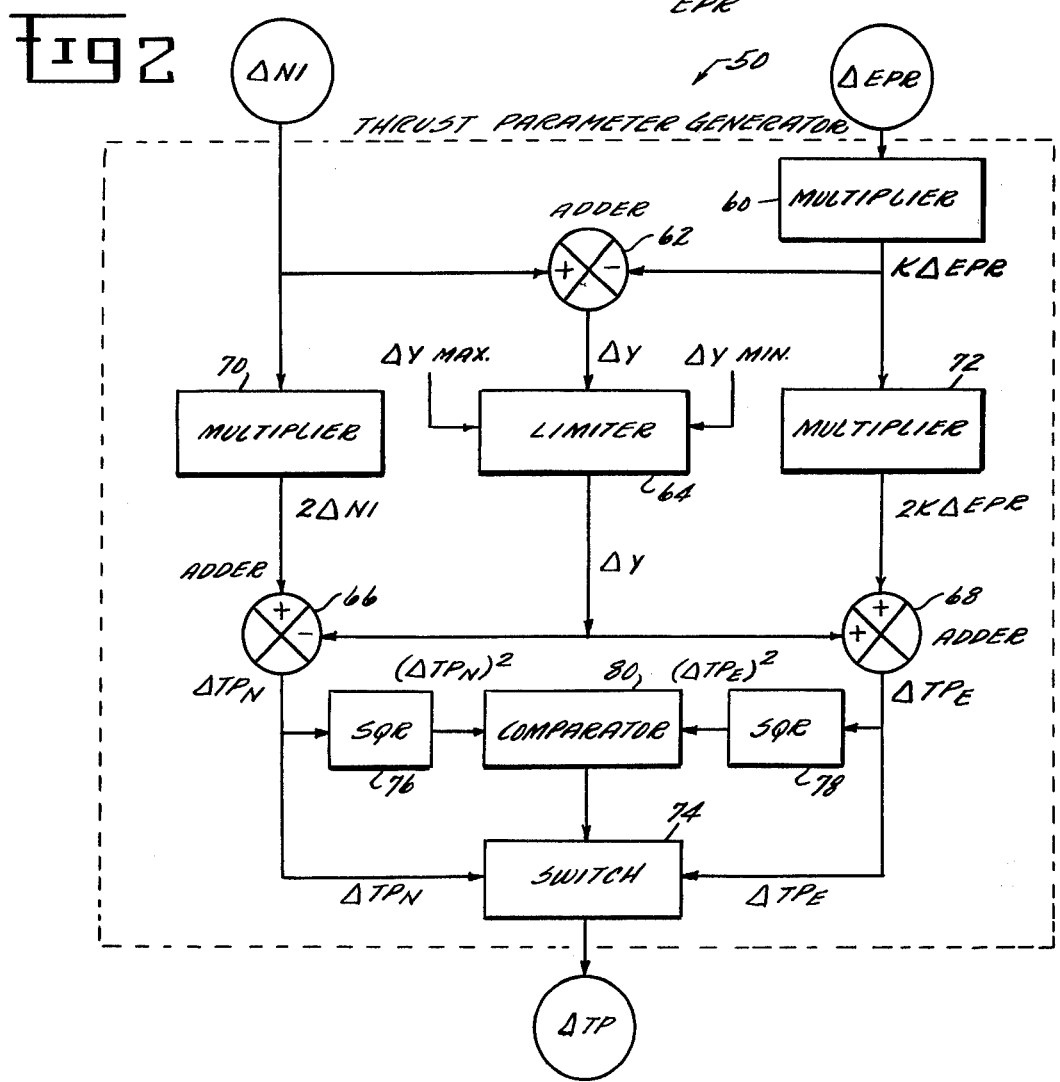

4,136,517

THRUST CONTROL SYSTEM FOR A GAS TURBINE ENGINE

BACKGROUND OF THE INVENTION

This invention relates to a thrust-setting system for a gas turbine engine and, more particularly, to an electronic control for setting the thrust in such an engine.

One of the main functions of an engine control system is to provide for the generation of that specific level of thrust required or demanded by the throttle position set by the pilot. Such a system, in order to insure that actual thrust corresponds to demanded thrust, must have a source of information respecting the actual thrust output of the engine. Since it is extremely impractical to provide a direct thrust measurement, a thrust-indicating parameter such as fan speed or engine pressure ratio, which is directly related to thrust, may be used as a proper source of information.

In modern-day gas turbine engines it is important that the reliability of the above-described thrust-setting system be quite high since failure of the systems may result in severe consequences. Prior art approaches to providing increased reliability have been varied and have included the utilization of secondary thrust-setting systems, which are normally inoperative and completely independent of a primary system, as a back-up system in the instance of failure of the primary system. These duplicative systems have proved to be expensive, especially with duplication of the complex and extensive control circuits normally associated with aircraft gas turbine engines. Moreover these secondary systems known in the prior art serve no useful function while the primary system is operative and hence the aforementioned expense is incurred on a secondary system that performs no useful benefit during most of the operating life of the gas turbine engine.

SUMMARY OF THE INVENTION

Therefore, it is an object of this invention to provide an improved thrust-setting system comprising an integration of the primary and secondary thrust-setting modes into a single redundant control whereby system complexity requirements are minimized, duplicity eliminated and wherein the redundant feature of the control is effective to contribute to the thrust-setting tasks of the control during normal operation of the gas turbine engine. This and other objects, which will hereinafter become apparent from a reading of the following specification with reference to the appended drawings, are accomplished by the present invention which, briefly stated and in one form, provides for a thrust-setting system for a gas turbine engine comprising first means associated with a first thrust-indicating parameter for providing a first indication related to the thrust output of the engine and a second means associated with a second thrust-indicating parameter for providing a second indication related to the thrust output of the engine. Third means are provided for varying the thrust output of the engine in a first mode wherein the variation is in response to the first and second thrust-indicating parameters. The third means is further adapted to vary the thrust output of the engine in a second mode wherein the variation is in response to the first thrust-indicating parameter and not in response to said second thrust-indicating parameter. The third means is operable in the second mode when the second means is in an abnormal operating condition. The third means may be responsive to first and second error signals for comparing said error signals and for varying the thrust output of the engine in said second mode when the difference between said error signals is not within a predetermined range of reference signal magnitudes.

DESCRIPTION OF THE DRAWING

For a better understanding of the present invention together with additional objects, advantages and features thereof, reference is made to the following description of the preferred embodiment along with the accompanying drawings in which:

FIG. 1 depicts a schematic representation of the engine thrust control system comprising the present invention; and FIG. 2 depicts a detailed schematic representation of the thrust parameter generator shown in FIG. 1.

DESCRIPTION OF THE PREFERRED EMBODIMENT

Referring now to FIG. 1 a schematic block diagram representation of the thrust-setting system shown generally at 20 is depicted. Gas turbine engine 22 includes appropriate sensors (not shown) for sensing operating conditions, or thrust-indicating parameters, within the engine which are indicative of the level of thrust generated by the engine. While a number of operating conditions may be indicative of the level of thrust, for purposes of this description and by way of example, fan speed (N1) and engine pressure ratio (EPR) have been selected as appropriate. Fan speed signal N1 representative of actual fan speed is transmitted by electrical conductor 24 from the sensor in engine 22 to fan speed adder 26 which also receives a fan speed demand signal N1a via electrical conductor 28 from fan speed demand reference generator 30. Fan speed demand generator 30 receives a plurality of input signals, namely by way of example, throttle position angle $\alpha$, engine total inlet temperature and engine total inlet pressure from which the fan speed demanded by the position of the throttle N1a is calculated. Adder 26 compares the fan speed demand N1a required by the pilot of the aircraft with the actual fan speed N1a of gas turbine engine 22 and provides an error signal $\Delta N1$ which is indicative of the difference of actual fan speed from that demanded by the throttle position. More specifically, error signal $\Delta N1$ is indicative of the deviation of thrust-indicating parameter N1 from the generated fan speed reference value N1a. Error signal $\Delta N1$ is received by a stabilizing circuit 32 via electrical conductor 34. Stabilizing circuit 32 may be of conventional designs known in the art and serves to filter or otherwise extract transitory perturbations from error signal $\Delta N1$.

Engine pressure ratio signal EPR representative of the actual engine pressure ratio of the operating engine is transmitted by electrical conductor 38 from engine 22 to an engine pressure ratio adder 40 which also receives an engine pressure ratio demand signal EPRa via electrical conductor 42 from an engine pressure ratio demand reference generator 44. Generator 44 receives a plurality of input signals similar to those received by generator 30 and calculates the engine pressure ratio demand EPRa required by the throttle setting in the aircraft. Adder 40 compares the engine pressure ratio demand EPRa required by the pilot with the actual engine pressure ratio EPR and provides an engine pressure error signal $\Delta EPR$. Error signal $\Delta EPR$ is indicative of the deviation of the thrust-indicating parameter EPR from the generated engine pressure ratio demand reference value EPRa. Error signal $\Delta$EPR pass via electrical conductor 46 to stabilizing circuit 48 which stabilizes the error signal $\Delta$EPR to rid the signal of transient perturbations.

Thrust parameter generator 50 receives the fan speed error signal $\Delta$N1 via conductor 52 and the engine pressure ratio error signal $\Delta$EPR via conductor 54. In a manner hereinafter to be described, thrust parameter generator 50 provides an output signal $\Delta$TP which, after passing through an integrator 56 via conductor 58, is provided to engine 22 as fuel flow error signal $\Delta$WF. The fuel flow error signal $\Delta$WF causes the fuel flow control valve to open (if positive) or to close (if negative) in order to drive the thrust parameter error $\Delta$TP to zero. When $\Delta$TP is equal to zero the engine 22 is operating in the steady state condition.

Referring now to FIG. 2, a schematic block diagram of thrust parameter generator 50 is depicted. Fan speed error signal $\Delta$N1 and engine pressure ratio error signal $\Delta$EPR are received by generator 50 as described above. Error signal $\Delta$EPR passes through a multiplier 60 wherein the $\Delta$EPR error signal is adjusted by a constant K. The resulting adjusted error signal K$\Delta$EPR is passed to adder 62 which also receives the fan speed error signal $\Delta$N1. Adder 62 subtracts the adjusted K$\Delta$EPR error signal from the fan speed error signal to determine the difference therebetween.

It should be noted that the factor K by which the $\Delta$EPR error signal is multiplied is chosen such that for any operating condition of an engine manufactured to theoretically nominal specification the adjusted K$\Delta$EPR error signal is equal in magnitude to the fan speed error signal $\Delta$N1. Said another way, the fan speed error $\Delta$N1 signal and the K$\Delta$EPR error signal are each indicative of the same degree of error in the thrust output of the nominal engine. However, the fan speed error $\Delta$N1 signal and the K$\Delta$EPR error signal for any given operational condition of an actual engine may not be equal due to normal variations in the quality of the engines or to normal deterioration of engine components during its sevice life. The present invention, in a manner hereinafter to be described, controls engine thrust in a first mode in accordance with both thrust-indicating parameters when the difference between the error signals associated with each thrust-indicating parameter is small and controls engine thrust in a second mode in accordance with one of the thrust-indicating parameters when the difference between the two error signals is substantial.

Referring again to FIG. 2, adder 62 provides a difference signal $\Delta$Y equal to the difference between the fan speed error signal $\Delta$N1 and the adjusted error signal K$\Delta$EPR ($\Delta$Y = N1 − K$\Delta$EPR). Signal limiter 64 is operative to pass difference signal $\Delta$Y in the event the magnitude thereof is between values $\Delta$Y min and $\Delta$Y max which together define a range of acceptable values of difference signal $\Delta$Y. In the event $\Delta$Y is not within the aforementioned range, the output of the limiter 64 is signal $\Delta$Y = $\Delta$Y min or $\Delta$Y = $\Delta$Y max whichever is appropriate.

The difference signal $\Delta$Y is simultaneously passed to a pair of adders 66 and 68. Fan speed error signals $\Delta$N1 and K$\Delta$EPR error signal are multiplied by a factor of 2 by multipliers 70 and 72 respectively. The multiplied fan speed error signal 2$\Delta$N1 is received by adder 66 which subtracts difference signal $\Delta$Y therefrom. The multiplied 2K$\Delta$EPR signal is received by adder 68 which adds difference signal $\Delta$Y thereto. The resulting signals, $\Delta$TPn and $\Delta$TPe, established by adders 66 and 68 respectively are passed to switch 74. Signals $\Delta$TPn and $\Delta$TPe are also passed to squaring circuits 76 and 78 respectively and each thence are received by comparator 80. Comparator 80 compares the magnitudes of $(\Delta TPn)^2$ and $(\Delta TPe)^2$ and on the basis of that comparison sends the appropriate signal to switch 74 to effect passage of either $\Delta$TPn or $\Delta$TPe to the fuel control valve associated with engine 22. More specifically comparator 80 can be made to determine which of the signals $(\Delta TPn)^2$ or $(\Delta TPe)^2$ is the smallest and thence causes switch 74 to pass the respectively associated $\Delta$TPn or $\Delta$TPe signal. As will hereinafter more fully be explained, in the first mode of operation $\Delta$TPn signal will be equal in magnitude to $\Delta$TPe signal whereby either of those signals may be passed to the fuel control valve associated with engine 22. In such an instance $\Delta$TPn = $\Delta$TPe = N1 + K$\Delta$EPR and it is readily observed that the thrust output of the engine is controlled in accordance with thrust-indicating parameter N1 and thrust-indicating parameter EPR. In the second mode of operation, the switch 74 will pass the smaller of the signals $\Delta$TPn or $\Delta$TPe. As will hereinafter be explained in the second mode the signal passed by switch 74 will be representative of only one of the thrust-indicating parameters N1 and EPR.

The operation of the aforedescribed apparatus in the first mode of operation will now be disclosed. The control system will operate in the first mode when the sensors and circuitry associated with both thrust-indicating parameters is normally operating. In the event the pilot of the aircraft desires to change the thrust output of engine 22, he will select a new throttle position. Since, as earlier described, a direct thrust measurement is impracticable to obtain, the control system described above is based upon thrust-indicating parameters and, more specifically, a pair of thrust-indicating parameters, fan speed N1 and engine pressure ratio EPR. The new throttle position will be received by both fan speed reference generator 30 and engine pressure ratio reference generator 44 whereupon a new fan speed reference signal N1a and a new engine pressure ratio reference signal EPRa will be generated by generators 30 and 44 respectively. Since the actual fan speed and actual engine pressure ratio of the engine have not yet been modified to reflect the change in throttle position made by the pilot, adders 26 and 40 provide fan speed error signal $\Delta$N1 and engine pressure ratio $\Delta$EPR which indicates that actual fan speed and engine pressure ratio are not in accordance with their respective reference values. The $\Delta$EPR reference signal is multiplied by the factor K by multiplier 60 and fed into adder 62 which also receives fan speed error signal $\Delta$N1. In the event that the magnitude of the difference signal $\Delta$Y is between $\Delta$Y max and $\Delta$Y min, the limiter 64 will provide to adders 66 and 68 an output signal $\Delta$Y equal to $\Delta$N1 − K$\Delta$EPR. Adder 66 will provide an output signal $\Delta$TPn = 2$\Delta$N1 − $\Delta$Y and similarly, adder 68 will provide an output signal $\Delta$TPe = 2K$\Delta$EPR + $\Delta$Y.

It is readily observed that when the dual parameter thrust control system comprising the present invention is in the first mode of operation the signal $\Delta$Y is within the range of magnitudes bounded by $\Delta$Y min and $\Delta$Y max, and the relationship given above for $\Delta$TPn and $\Delta$TPe is such that $\Delta$TPn = $\Delta$TPe = $\Delta$N1 + K$\Delta$EPR since $\Delta$Y = $\Delta$N1 − K$\Delta$EPR. In such an instance comparator 80 will provide an output signal to switch 74 such that switch 74 may pass either of the two signals $\Delta TPn$ or $\Delta TPe$. Hence, in the first mode of operation, the output signal $\Delta TP = \Delta N1 + K\Delta EPR$ which is used to control engine thrust, is dependent upon two thrust-indicating parameters, namely, fan speed N1 and engine pressure ratio EPR when the difference between two error signals $\Delta N1$ and $\Delta EPR$ is within a certain range $\Delta Y$ max to $\Delta Y$ min.

In the event that the circuitry or sensors associated with either of the two thrust-indicating parameters becomes inoperative or abnormally operative the present invention provides for thrust management in a second mode by use of the remaining thrust-indicating parameter in the following manner. By way of example, assume the engine pressure ratio sensors have malfunctioned so as to indicate an inaccurate and abnormally high engine pressure ratio which is higher than the actual engine pressure ratio. The engine pressure ratio signal EPR delivered to adder 40 will be abnormally high resulting in an excessive and inaccurate $\Delta EPR$ error signal from adder 40. Adder 62 provides difference signal $\Delta Y = \Delta N1 - K\Delta EPR$ which will be negative in sign (since $K\Delta EPR$ is greater than $\Delta N1$) and excessively large in magnitude such that $\Delta Y$ will be less than $\Delta Y$ min. Hence limiter 64 provides a difference signal of $\Delta Y$ min as an output. The output $\Delta TPn$ of adder 66 is $\Delta TPn = 2\Delta N1 - \Delta Y$ min while the output of adder 68 is $\Delta TPe = 2K\Delta EPR + \Delta Y$ min. Since $K\Delta EPR$ is greater than $\Delta N1$ it is clear that $(\Delta TPn)^2 < (\Delta TPe)^2$ and hence comparator 80 can provide output signal effective to cause switch 74 to pass signal $\Delta TPn = 2\Delta N1 - \Delta Y$ min. Hence in the second mode of operation, the output signal $\Delta TP = 2\Delta N1 - Y$ min, used to control engine thrust when the sensors or circuitry associated with one of the thrust-indicating parameters EPR exhibits a malfunction, is representative solely of the other functioning parameter N1. Conversely, in the event that abnormal operation occurs in the sensors or circuitry associated with fan speed thrust-indicating parameter, then the present invention is effective to provide for thrust setting in the aforementioned second mode by the engine pressure ratio thrust-indicating parameter EPR. In this manner then the thrust-setting system is isolated from the effects of abnormal operation of the sensors or circuitry associated with a thrust-indicating parameter.

From the aforegoing description it can be seen that the present invention provides a thrust-setting system having a redundant capability. A primary or first mode is presented wherein a pair of thrust-indicating parameters are utilized to set engine thrust. A secondary thrust-setting mode is available wherein one of the pair of thrust-indicating parameters is used to set thrust when the sensors or circuitry associated with the other of the pair is operating abnormally or is inoperative.

Another feature of the present invention is associated with operation of the thrust-setting system in the first mode of operation when the difference signal $\Delta Y$ is within the range $\Delta Y$ min to $\Delta Y$ max. In the event slight discrepancies occur in the system associated with one of the thrust-indicating parameters, such as a slight discrepancy due to normal manufacturing variations or to normal engine deterioration caused by wear of engine parts, the effect of the discrepancy is minimized as compared to the effect of the discrepancy in a thrust-setting system utilizing only one thrust-indicating parameter. By way of example, assume that the pilot has set his throttle position at 99% of fully rated fan speed and further assume that the fan speed sensors were manufactured within the normal range of tolerances and specifications so as to provide an acceptable but nonetheless inaccurate fan speed indication which is 2% higher than actual fan speed or 101%. In a single-parameter thrust control system using fan speed as the thrust-indicating parameter, the inaccurate sensor will cause the actual fan speed to be set 2% low or at 97% of fully rated fan speed. At such a setting the control system will erroneously believe that it is complying with the 99% fan speed demand required by the throttle position. In the dual parameter control system comprising the present invention, the same 2% inaccuracy caused by the sensor will result in the setting of actual fan speed only 1% low at 98%. This feature of the present invention will now be more fully explained with reference by way of example to the same assumptions taken above.

In the dual parameter control system comprising the present invention, the slight inaccuracy in fan speed would not be sufficient to cause the difference signal $\Delta Y$ to exceed the limits of $\Delta Y$ min or $\Delta Y$ max and hence the system would continue to operate in the primary mode. As the dual parameter control system begins to reduce the thrust output of the engine in response to the apparent 2% error in actual fan speed, an error signal $\Delta EPR$ is generated which error signal is indicative of the need for an increase in thrust and hence an increase in the engine pressure ratio. In other words, the thrust parameter error signal $\Delta TP = \Delta N1 + K\Delta EPR = 2\% + 0\% = 2\%$ will cause the engine 22 to begin to reduce thrust by reducing actual fan speed from its initial level of 99% of fully rated fan speed. As actual fan speed is reduced the actual engine pressure ratio will also be reduced whereby an engine pressure ratio error signal $\Delta EPR$ will be generated indicative of the fact that the engine thrust and actual engine pressure ratio is not in accordance with that required or demanded by the throttle position setting. The $\Delta EPR$ error signal will require an increase in thrust and hence engine pressure ratio. As fan speed is reduced further, the $\Delta EPR$ error signal will continue to increase. However, the dual control system will continue to reduce thrust by reducing actual fan speed only until the sum of the fan speed error signal $\Delta N1$ and the modified engine pressure ratio error signal $K\Delta EPR$ is equal to zero; that is $\Delta TP = \Delta N1 + K\Delta EPR = 0$. This relationship will be satisfied when $\Delta N1 = +1\%$ and $K\Delta EPR = -1\%$ whereupon $\Delta TP = +1\% + (-1\%) = 0$. With $\Delta TP$ equal to zero adjustments to the actual fan speed will cease. It is observed that actual fan speed has been changed from 99% to 98% a difference of 1% as a result of the dual parameter control system's response to the 2% higher fan speed indicated by the sensors. Consequently, with the dual parameter control system comprising the present invention the actual fan speed of 98% is obtained whereas in a single parameter control system an actual fan speed of 97% is obtained under the same conditions of fan speed demand and fan speed sensor induced discrepancies. Hence, with the present invention the deviation of actual fan speed from demand speed is one-half (1% vs. 2%) of the deviation in a single-parameter control system.

Although the present invention has been described in terms of its preferred embodiments, it is apparent to those skilled in the art that changes and modifications thereof may be made without departing from the scope of the appended claims which define the present invention.

I claim:

1. In a thrust-setting system for a gas turbine engine, the invention comprising:
   first means associated with a first thrust-indicating parameter for providing a first indication related to the thrust output of said engine;
   second means associated with a second thrust-indicating parameter for providing a second indication related to the thrust output of said engine;
   third means for varying the thrust output of said engine to correspond to a demanded level in a first mode wherein said variation is in response to said first and second thrust-indicating parameters, said third means adapted to vary said thrust output to correspond to a demanded level in a second mode wherein said variation is in response to said first thrust-indicating parameter and not in response to said second thrust-indicating parameter.

2. The invention as set forth in claim 1 wherein said third means is operable in said second mode when said second means is in an abnormal operating condition.

3. In a thrust-setting system for a gas turbine engine, the invention comprising:
   first means for determining a first error indicative of the deviation of a first thrust-indicating parameter of said engine from a first reference value;
   second means for determining a second error indicative of the deviation of a second thrust-indicating paramerter of said engine from a second reference value;
   third means for comparing said first and second errors for determining the difference between said first and second errors and for adjusting the thrust output of said engine to correspond to a demanded level in accordance with both of said first and second thrust-indicating parameters when said difference is within a predetermined range of reference magnitudes.

4. The invention as set forth in claim 3 wherein said thrust output of said engine is varied in a second mode in accordance with only one of said first and second thrust-indication parameters when said difference is not within said range of reference magnitudes.

5. The invention as set forth in claim 4 wherein said predetermined range of magnitudes is selected to provide for variation of said thrust output in said second mode when said first means is in an abnormal operating condition.

6. In a thrust-setting system for a gas turbine engine, the invention comprising:
   first means for generating a first error signal indicative of the deviation of a first thrust-indicating parameter of said engine from a first reference value;
   second means for generating a second error signal indicative of the deviation of a second thrust-indicating parameter of said engine from a second reference value;
   third means responsive to said first and second error signals for providing an output signal in a first mode wherein said first and second means are in normal operating condition and wherein said output signal is indicative of both of said first and second error signals, said third means further providing an output signal in a second mode when said first means is in an abnormal operating condition and wherein said output signal is not indicative of said first error signal;
   fourth means responsive to said output signal for delivering metered fuel to said engine in order to adjust the thrust output of said engine to correspond to a demanded level.

7. The invention as set forth in claim 6 wherein said third means is responsive to the difference between the magnitude of said first error signal and the magnitude of said second error signal.

8. The invention as set forth in claim 7 wherein said third means includes difference signal generating means for generating a signal indicative of the difference between the magnitude of said first error signal and the magnitude of said second error signal.

9. The invention as set forth in claim 8 wherein said output signal is varied in accordance with said difference signal.

10. The invention as set forth in claim 9 wherein said third means is adapted to provide said output signal as indicative of both of said first and second error signals when said difference signal is within a predetermined range of reference signal magnitudes and further adapted to provide said output signal as indicative of said first error signal when said difference signal is not within said predetermined range of reference signal magnitudes.

11. The invention as set forth in claim 7 wherein said third means includes difference signal generating means for generating a signal indicative of the difference between the magnitude of said first error signal and the magnitude of said second error signal and further includes signal limiting means for limiting the magnitude of said difference signal to within a predetermined range of signal magnitudes.

12. The invention as set forth in claim 11 wherein said signal limiting means limits the magnitude of said difference signal when said first means is in an abnormal operating condition.

13. The invention as set forth in claim 12 wherein said output signal is responsive to said limited difference signal when said third means provides said output signal in said second mode.

* * * * *